March 21, 1961 YOSHIO ICHIKAWA 2,976,505
THERMISTORS
Filed Feb. 24, 1958 2 Sheets-Sheet 1
Fig. I.
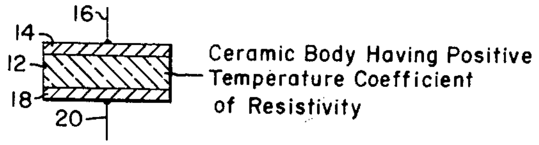
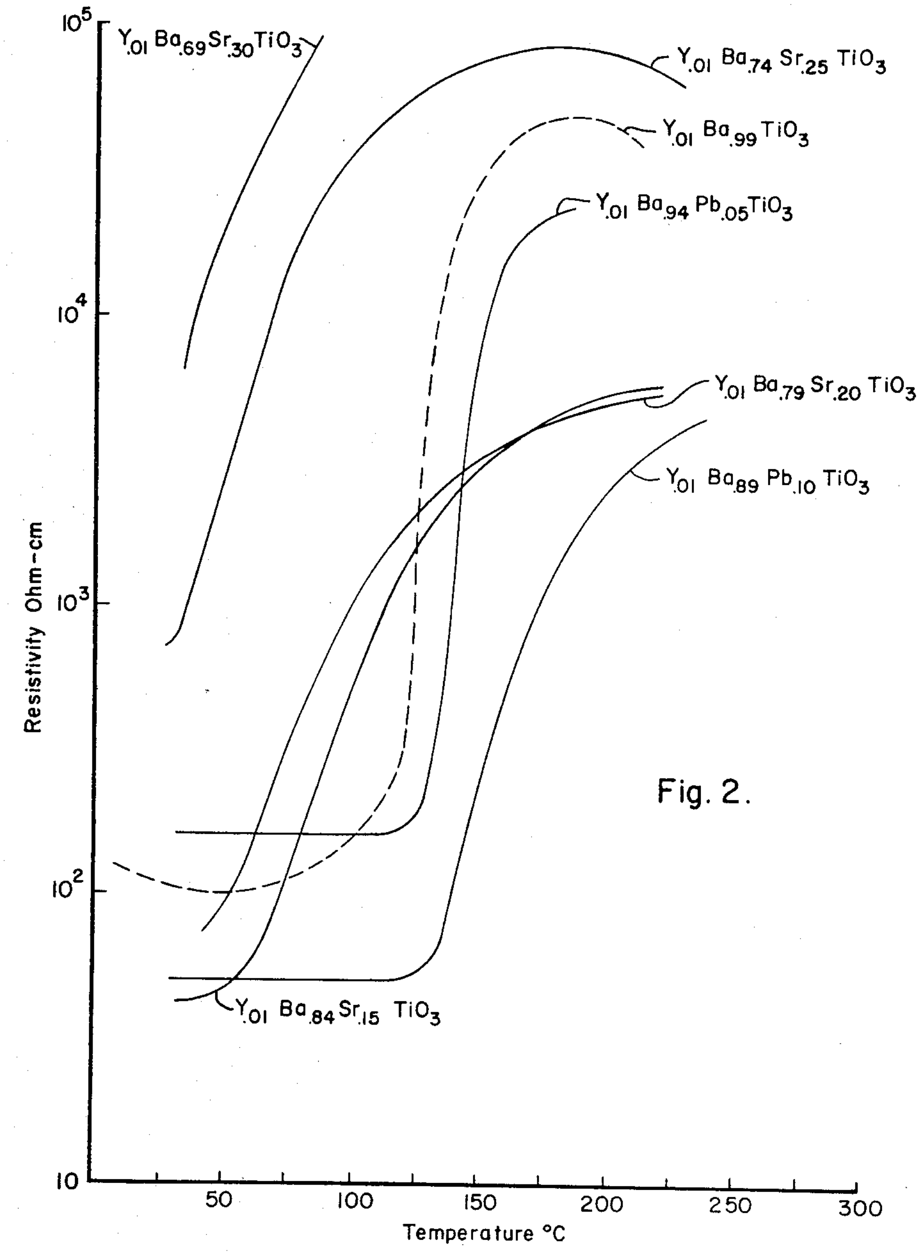
Fig. 2.

March 21, 1961 YOSHIO ICHIKAWA 2,976,505

THERMISTORS

Filed Feb. 24, 1958 2 Sheets-Sheet 2

WITNESSES:
Bernard R. Giegucz
James F. Young

INVENTOR
Yoshio Ichikawa
BY
Frederick Shapoe
ATTORNEY

United States Patent Office 2,976,505

Patented Mar. 21, 1961

2,976,505

THERMISTORS

Yoshio Ichikawa, Swissvale, Pa., assignor to Westinghouse Electric Corporation, East Pittsburgh, Pa., a corporation of Pennsylvania Filed Feb. 24, 1958, Ser. No. 717,191

8 Claims. (Cl. 338—22)

This invention relates to thermistors comprising ceramic bodies having a high positive temperature coefficient of electrical resistance and processes for preparing them.

Ceramic semiconductor materials are generally known as possessing negative temperature coefficients of resistance, that is, the electrical resistance decreases as the temperature increases. More recently there have been disclosed some materials which have positive temperature coefficients of resistance. However, these materials such as those disclosed in British 714,965, are characterized by only a moderate change in resistance per degree centigrade. In other words, it requires a substantial change in temperature before a marked change in total resistance occurs.

Furthermore, the known materials are characterized by variability of resistivity at any temperature level. In employing such semiconductor materials for temperature control purposes, the variability is so great that individual corrections must be applied to the material in each device employing them.

It would be desirable to have available a material that has a relatively constant predetermined resistivity over a range of temperatures, for example, at room temperature, and then a sudden increase in resistance within a selected range of temperatures and almost abruptly reaches a resistance from 10 to 100 times greater in a matter of a few degrees. The room temperature resistivity should be controllable within rather close limits and the temperature at which the resistance begins to rise abruptly likewise should be readily preselected and controllable with considerable accuracy so that individual calibrations and adjustments are not required for each device employing them.

Thermally sensitive ceramic bodies having a negative coefficient temperature of resistance are commonly called "thermistors." Such thermistors are widely employed in electrical and electronic equipment for measuring temperatures, controlling temperatures, controlling a voltage for stabilization of electrical current, for making thermal conductivity measurements and in numerous other applications. A thermistor material with a marked positive temperature coefficient of electrical resistance would be highly desirable for use in electronics and electrical equipment, since it would in many cases increase the accuracy of the devices and simplify their construction. It is particularly desirable that these positive temperature coefficient thermistor materials be characterized by a very abrupt rise in resistance in a range of a few degrees of temperature from a relatively constant low resistance to an extremely high resistance. With such thermistor materials, marked improvement in the electric devices could be made with considerable increase in sensitivity of the devices. Furthermore, much more precise and accurate control could be effected by use of such improved materials.

The object of the present invention is to provide new thermistor materials having characteristics such that at low temperatures the electrical resistivity is substantially constant and upon reaching a predetermined temperature, the electrical resistance increases abruptly so that in a range of a few degrees the electrical resistance will increase many times to a high value.

Another object of the invention is to prepare ceramic bodies having a marked positive temperature coefficient of electrical resistivity over a selected narrow range of temperatures, the body comprising a stoichiometric combination of titanium dioxide, and one of the group consisting of barium oxide, barium strontium oxide and barium lead oxides with controlled small amounts of trivalent rare earth metal oxides in order to produce a predetermined low temperature resistivity.

A still further object of the invention is to provide a process for preparing certain titanate ceramic bodies so that the member will exhibit a marked positive temperature coefficient of resistivity within a relatively narrow range of temperatures.

Other objects of the invention will in part be obvious and in part appear hereinafter.

For a better understanding of the nature and scope of the invention, reference should be had to the following, in which:

Figure 1 is a view in elevation of a resistance member in accordance with the invention;

Fig. 2 is a graph plotting resistivity of a number of materials against temperature;

Figure 3:
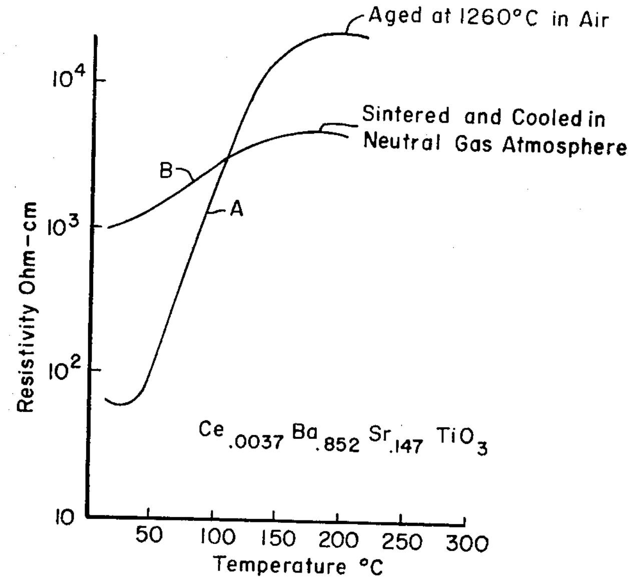
Fig. 3 is a graph plotting resistivity against temperature for a material processed in several different ways.

In accordance with the present invention, it has been discovered that certain ceramic materials composed essentially of (A) 1 mol of titanium dioxide and (B) a total of 1 mol (*a*) up to 0.999 mol of an oxide selected from the group consisting of barium oxide, barium strontium oxide, lead oxide and barium lead oxide and (*b*) a metal oxide selected from the group consisting of from 0.001 mol to 0.006 mol of cerium oxide and from 0.005 to 0.02 mol of yttrium oxide, when intimately and homogeneously combined and fired to form a ceramic body exhibiting a predetermined electrical resistance over a low range of temperatures and when heated to a selected temperature will exhibit an extremely high positive temperature coefficient of electrical resistance whereby the resistance will increase, usually in a few degrees, many times to a high upper resistance value.

In particular, the composition may be varied and readily controlled so that the range of temperatures within which the resistance begins to rise may be selected rather closely and further the low temperature resistivity may be selected as desired. Thus, the low temperature resistivity may be readily selected so that the resistance in ohm-centimeters may be from a value as low as 10 ohm-centimeters to about 10,000 ohm-centimeters, while the higher resistance attained on heating to a selected higher temperature is approximately 100 to 1000 times greater. Also, the temperature at which the resistivity begins to increase rapidly has been varied and readily controlled to a selected value within the temperature range of about 40° to 186° though this range is not limiting since it can be broadened to be as low as 0° C. or as high as 490° C.

Basically the preferred ceramic thermistor composition of the present invention comprises stoichiometric proportions of (A) titanium dioxide and (B) a mixture of (*a*) oxides from the group comprising barium oxide, strontium oxide and lead oxide and (*b*) a small but critical proportion of cerium oxide and yttrium oxide. In preparing the compositions titanium dioxide, preferably anatase, is combined with barium oxide or a compound which will engender barium oxide during firing, for example, barium carbonate. The lead oxide and strontium oxide components may be added as such or the carbonate. The yttrium or cerium oxides may be added as the oxides or preferably the nitrates or oxalates thereof. The compounds are preferably of a high purity.

The correct proportions of the titanium dioxide, barium oxide or barium carbonate, and the yttrium or cerium containing materials, with or without the lead and strontium compounds are wet mixed, using water, in a porcelain ball mill in order to produce a homogeneous mixture. The resultant intimate admixture is dried as, for example, at 80° C. and then calcined while exposed to air in a refractory crucible, at a temperature of, for example, 1000° C. for a period of hours. The calcined product comprises an intimate mixture of oxides of titanium, barium, yttrium or cerium, as well as lead oxide or strontium oxide if the latter is present. In order to assure the best results the calcined mixture of oxides is wet milled in a porcelain ball mill to an extremely fine slurry. Ball milling with flint pebbles for a period of up to 16 hours has given good results. The slurry is dried and pulverized, if necessary, to pass through a 200 mesh sieve. In preparing ceramic bodies the resultant fine powder may be admixed with a volatile organic binder, and the mixture with the binder is then pressed at a high pressure in a suitable die. Good results have been obtained when pressures of 5,000 to 50,000 lbs. per square inch were applied to the oxide powders. The pressed bodies are sintered in an inert atmosphere, preferably argon, at a temperature to densify the body or pellets. For barium titanate bodies, sintering temperatures of about 1470° C. to 1400° C. are sufficient. For barium lead titanates, the sintering temperatures may be somewhat lower, for example, 1120° C. to 1200° C. It will be understood that at the lower temperatures longer times will be required; usually sintering for an hour or two is adequate. After sintering in the protective atmosphere the vitrified ceramic bodies are aged in air at a temperature of at least 1000° C. to as high as 1350° C. for several hours. This aging in air has been found to be critical in producing satisfactory thermistor devices.

More specifically, it has been discovered that by adding strontium oxides to replace up to 30 mol percent of the barium oxides, the temperature at which the ceramic bodies will begin to abruptly increase in electrical resistance will be progressively lowered. On the other hand, when lead oxide replaces a part or all of the barium oxide, the temperature at which the resistance of them both begins to increase abruptly is proportionally increased. The addition of the yttrium and cerium oxides to the composition causes the members to have lower resistivity at, for example, room temperature, as the quantity thereof increases.

Particularly good results have been obtained with the following compositions:

$Y_xBa_{(1-x)}TiO_3$—where $x$=.005 to .02

$Ce_xBa_{(1-x)}TiO_3$—where $x$=.003 to .006

$Y_mBa_{(1-m-x)}Sr_xTiO_3$—where $m$ has a value of from 0.005 to 0.02 and $x$=0.01 to 0.30

$Y_{.01}Ba_{(.99-x)}Sr_xTiO_3$—where $x$=.01 to .30

$Y_nBa_{(1-n-x)}Pb_xTiO_3$—where $n$=0.005 to 0.02 and $x$=0.01 to 0.25

$Y_{.01}Ba_{(.99-x)}Pb_xTiO_3$—where $x$=0.01 to 0.25

$Ce_nBa_{(1-n-x)}Pb_xTiO_3$—where $n$=0.005 to 0.02 and $x$=0.01 to 0.30

$Ce_{.006}Ba_{(.994-x)}Pb_xTiO_3$—where $x$=.01 to .25

$Ce_nBa_{(1-n-x)}Sr_xTiO_3$—where $n$=0.003 to 0.006 and $x$=0.01 to 0.30

$Ce_{.006}Ba_{(.994-x)}Sr_xTiO_3$—where $x$=.01 to .30

Particular attention is directed to the fact that in no case is there any molar excess of titanium dioxide over the combined total mols of barium oxide, barium strontium oxide, or barium lead oxide and the cerium or yttrium oxides. The compositions are maintained with a close stoichiometric balance. The addition of silicon oxides and iron oxide has been found to be detrimental in amounts as low as 0.001 mol.

The following examples illustrate the practice of the invention.

EXAMPLE I

One mol of titanium dioxide, anatase, is admixed with .94 mol of barium carbonate, 0.05 mol of lead carbonate and 0.01 mol of yttrium carbonate. The ingredients are wet mixed in water in a porcelain ball mill using flint pebbles for 2 to 4 hours. The slurry was dewatered and then dried at 80° C. in air. The dry powder was placed in a zirconia crucible and then heated in a furnace for 2 hours at a temperature of 1000° C. The calcined product was placed in a porcelain ball mill and was wet milled in water using flint pebbles, for 8 hours. The resulting slurry was dried completely at 80° C., and the dry powder was broken up and then screened through a 200 mesh sieve. The screened powder was admixed with a water emulsion of hyform in amounts of approximately 20 millimeters of the emulsion per hundred grams of the powder. The resulting mixture was then pressed at a pressure of 50,000 p.s.i. into a cylindrical pellet. The pellet was sintered in argon atmosphere at 1400° C. while disposed on a zirconia plate for 2 hours. Thereafter, the vitrified pellet was withdrawn and then was placed within a circulating air furnace and aged at 1250° C. for 2 hours.

The resistivity of the resulting pellet was determined by placing electrodes comprising an alloy of indium, lead, and silver, for example, 10% indium, 80% lead, and 10% silver, on both faces and ultrasonically soldering the alloy thereto. The room temperature resistivity up to approximately 120° C. was 200 ohm centimeters. At approximately 125° C. the resistivity began to rise rapidly so that at 150° C. the resistivity was approximately 7000 ohm centimeters. Thereafter the resistivity rose more reaching a maximum of approximately 30,000 ohm centimeters at about 180° C. where the resistivity leveled off, and at higher temperatures it began to drop.

By modifying the proportion of the composition of Example I to increase the lead to 0.1 mol while the barium comprised .89 mol, the yttrium remaining at .01 mol, there resulted a composition which has a relatively uniform resistivity of approximately 75 ohm centimeters at room temperature and up to temperatures of about 120° C. At 125° C. the resistivity increases rapidly with temperature rising as rapidly as the composition of Example I to a total of resistivity of 3000 ohm centimeters at 200° C.

*Example II*

A composition was prepared from 1 mol of titanium dioxide (anatase), 0.74 mol barium oxide, 0.25 strontium oxide, and .01 yttrium oxide and vitrified and air aged pellets were prepared following the procedure of Example I. Up to a temperature of approximately 25° C. the resistivity of the composition was approximately 800 ohm centimeters. At a temperature of 30° C. the resistivity began to increase rapidly so that at a temperature of 70° C. the resistivity was 10,000 ohm centimeters. At approximately 175° C. the resistivity had leveled off at a value of approximately 90,000 ohm centimeters and thereafter dropped slightly.

Referring to Fig. 1 of the drawing, there is illustrated a thermistor device 10 which comprises a ceramic body 12 prepared as disclosed herein, of the vitrified and aged ceramic composition of this invention. To the upper face of the body 12 is affixed a contact layer 14 composed of a suitable metal or alloy or other good electrical conducting material into ohmic contact with the body 12. It will be understood that the layer 12 may be applied by soldering, brazing or other suitable techniques providing, however, that there be a very low resistance between the surfaces of the body 12 and the layer 14. A suitable electrical lead 16 is affixed to the layer 14. Similarly, a counterelectrode 18 is affixed to the lower surface of the body 12 and carries an electrical lead 20. It will be understood that the shape and dimensions of the ceramic body 12 will be dependent of the application, the desired ohmic resistance and the like. For many applications the body 12 will be a circular cylinder.

Referring to Fig. 2 of the drawing, there is illustrated the electrical properties of a series of barium strontium titanates and barium lead titanates, all containing 0.01 mol of yttrium. It will be noted that the temperature at which the abrupt rise in electrical resistivity occurs is between 25 and 50° C. for the barium strontium titanates. The initial low resistivity assumes a value which is higher as the proportion of strontium increases. By substituting lead for a part of the barium the temperature at which the resistivity rapidly increases is shifted to approximately 120 to 130° C. Increasing the proportion of lead reduces the low temperature resistivity values in proportion thereto.

*Example III*

Referring to Fig. 3 of the drawings there is illustrated the characteristic resistivity curves of a cerium barium strontium titanate, comprising 0.0037 mol of cerium, 0.852 mol of barium and 0.14 mol of strontium. The curve A was determined on a sample of the vitrified ceramic material which was produced by following the procedure set forth in Example I being concluded by aging 2 hours in air at 1260° C. It will be noted that the resistivity at approximately room temperature (25° C.) is 70 ohm centimeters. The resistivity at 50° C. is approximately 100 ohm centimeters; at 75° C. the resistivity is approximately 250 ohm centimeters and at 150° C. the resistivity is approximately 15,000 ohm centimeters. Curve B is that obtained by testing the composition which was only sintered in the argon atmosphere of 1390° C. The composition used in curve B was not aged in air at 1260° C. as was the material from which curve A was prepared. It will be noted that the room temperature resistivity value of material B is approximately 1000 ohms and that the slope of the curve is much less than that of curve A. Consequently, the positive temperature coefficient of resistance for room temperature to 150° C. is relatively moderate.

*Example IV*

A ceramic body was prepared following the process of Example I employing the following composition: 0.99 mol barium, 0.01 yttrium and 1 mol of titanium oxide. Curve C of Fig. 4 indicates the electrical resistivity with change of temperatures. It will be noted that the resistivity at approximately 50° C. is approximately 1500 ohm centimeters. When the ceramic material is heated to temperatures of 100° C. and higher the resistivity increases with great rapidity. Thus, at 110° C. the resistivity is 4,000 ohm centimeters and at 150° C. the resistivity is in the neighborhood of 600,000 ohm centimeters. Such an abrupt change in resistivity renders the material employed for curve C in Fig. 4 highly useful for electrical control and temperature measuring devices.

Figure 4:
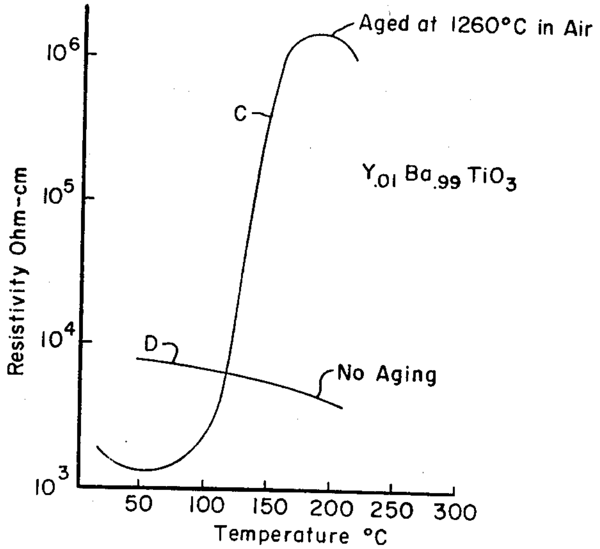
Fig. 4 is a graph plotting resistivity against temperature for unaged and aged ceramic material.

In order to indicate the benefits of the air aging step of the process the same material employed for curve C in Fig. 4 was sintered at 1300° C. but was not aged in air. The electrical properties as shown in curve D indicate a negative temperature coefficient of quite low value. Thus the air aging converts a negative temperature coefficient to a very marked positive temperature coefficient.

It will be understood that the present specification and drawing are only illustrative and not limiting.

I claim as my invention:

1. A ceramic body having a positive temperature coefficient of electrical resistance over a selected range of temperatures, the body comprising the fired product composed essentially of 1.00 mol of titanium dioxide, and a total of one mol of (*a*) up to 0.999 mol of a barium oxide, barium strontium oxide, lead oxide, and barium lead oxide, and (*b*) a rare earth metal oxide selected from the group consisting of from 0.001 mol to 0.006 mol of cerium oxide and from 0.005 to 0.02 mol of yttrium oxide, the body being initially fired in an inert atmosphere to sinter it and thereafter fired in air at a temperature of at least 1000° C. for a period of hours.

2. A ceramic body having a positive temperature coefficient of electrical resistance over a selected range of temperatures, the body comprising the fired product comprising $Y_xBa_{(1-x)}TiO_3$ where $x$ has a value of from 0.005 to 0.02, the body being initially fired in an inert atmosphere to sinter it and thereafter fired in air at a temperature of at least 1000° C. for a period of hours.

3. A ceramic body having a positive temperature coefficient of electrical resistance over a selected range of temperatures, the body comprising the fired product comprising $Ce_xBa_{(1-x)}TiO_3$ where $x$ has a value of from 0.003 to 0.006, the body being initially fired in an inert atmosphere to sinter it and thereafter fired in air at a temperature of a least 1000° C. for a period of hours.

4. A ceramic body having a positive temperature coefficient of electrical resistance over a selected range of temperatures, the body comprising the fired product comprising $Y_nBa_{(1-n-x)}Pb_xTiO_3$ where $n$ has a value of from 0.005 to 0.02, and $x$ has a value of from 0.01 to 0.25, the body being initially fired in an inert atmosphere to sinter it and thereafter fired in air at a temperature of at least 1000° C. for a period of hours.

5. A ceramic body having a positive temperature coefficient of electrical resistance over a selected range of temperatures, the body comprising the fired product comprising $Y_mBa_{(1-m-x)}Sr_xTiO_3$ where $m$ has a value of 0.005 to 0.02 and $x$ has a value of from 0.01 to 0.30, the body being initially fired in an inert atmosphere to sinter it and thereafter fired in air at a temperature of at least 1000° C. for a period of hours.

6. A ceramic body having a positive temperature coefficient of electrical resistance over a selected range of temperatures, the body comprising the fired product comprising $Ce_nBa_{(1-n-x)}Pb_xTiO_3$ where $n$ has a value of 0.005 to 0.02 and $x$ has a value of from 0.01 to 0.30, the body being initially fired in an inert atmosphere to sinter it and thereafter fired in air at a temperature of at least 1000° C. for a period of hours.

7. A ceramic body having a positive temperature coefficient of electrical resistance over a selected range of temperatures, the body comprising the fired product comprising $Ce_nBa_{(1-n-x)}Sr_xTiO_3$ where $n$ has a value of from 0.003 to 0.006, and $x$ has a value of from 0.01 to 0.30, the body being initially fired in an inert atmosphere to sinter it and thereafter fired in air at a temperature of at least 1000° C. for a period of hours.

8. A thermistor device comprising a ceramic body having a positive temperature coefficient of electrical resistance over a selected range of temperatures, the body comprising the fired product composed essentially of 1.00 mol of titanium dioxide, and a total of one mol of (*a*) up to 0.999 mol of a barium oxide, barium strontium oxide, lead oxide, and barium lead oxide, and (*b*) a rare earth metal oxide selected from the group consisting of from 0.001 mol to 0.006 mol of cerium oxide and from 0.005 to 0.02 mol of yttrium oxide, the body being initially fired in an inert atmosphere to sinter it and thereafter fired in air at a temperature of at least 1000° C. for a period of hours, electrical leads affixed to the body by an ohmic contact comprising a soldered joint.

References Cited in the file of this patent

UNITED STATES PATENTS

| | | |
|---|---|---|
| 2,398,088 | Ehlers et al. | Apr. 9, 1946 |
| 2,432,250 | Rath | Dec. 9, 1947 |
| 2,434,236 | Johannes et al. | Jan. 6, 1948 |
| 2,616,813 | Klasens | Nov. 4, 1952 |

FOREIGN PATENTS

| | | |
|---|---|---|
| 714,965 | Great Britain | Sept. 8, 1954 |
| 780,735 | Great Britain | Aug. 7, 1957 |